June 19, 1928.  W. E. THAYER ET AL  1,674,417
SPINDLE TESTER
Filed Oct. 12, 1927
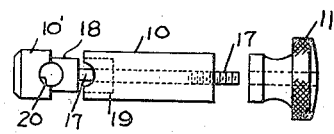
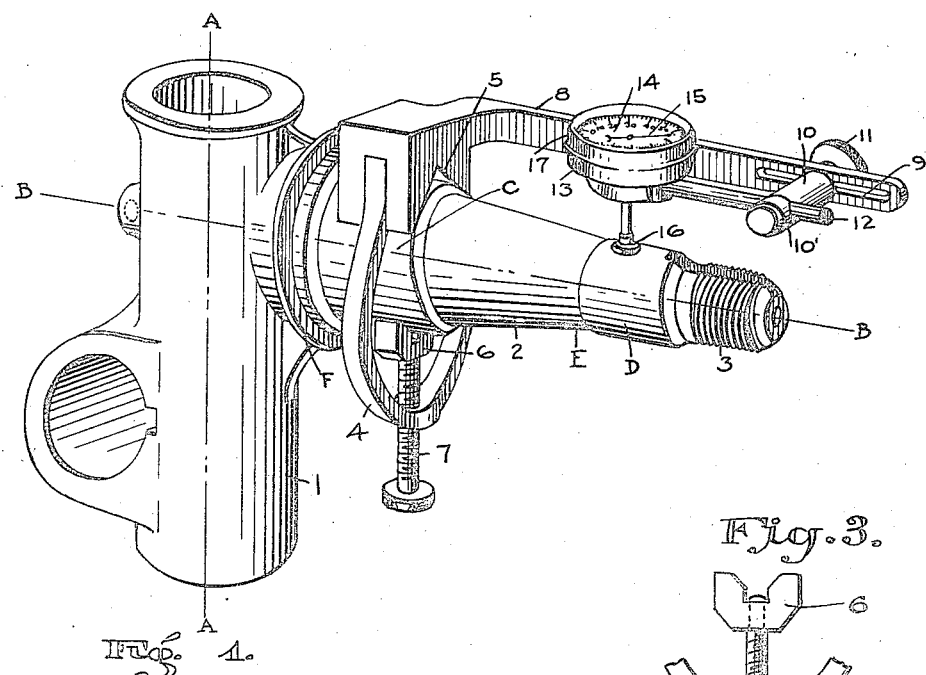
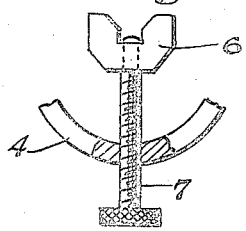
INVENTORS
William E. Thayer and
BY Frederick W. West
ATTORNEYS.

Patented June 19, 1928.

1,674,417

UNITED STATES PATENT OFFICE.

WILLIAM E. THAYER AND FREDERICK W. WEST, OF SAN FRANCISCO, CALIFORNIA.

SPINDLE TESTER.

Application filed October 12, 1927. Serial No. 225,688.

This invention relates to the testing of two spaced bearings on a common shaft axis, such as the two bearing positions on an automobile steering knuckle.

The objects of the invention are to provide a method for testing alignment of the spindles on such knuckles without removing the steering knuckles from the vehicle, and also to provide apparatus for carrying out the method.

The drawings show in Fig. 1 a perspective view of an automobile steering knuckle with my testing apparatus in place, Fig. 2 is an enlarged partly disassembled view of the gage arm clamp, and Fig. 3 is a broken sectional view of the swivel block joint of the apparatus.

The steering knuckle of an automobile is represented at 1 and comprises a T shaped forging bored for a vertical pin along the axis A—A and provided with the wheel-supporting spindle 2 centered on an axis B—B lying substantially at right angles to axis A—A.

The spindle 2 is relatively very large where it joins the body 1 of the knuckle and tapers rapidly to the outer end where it is threaded as at 3 for the usual nut which holds the wheel in place, and on this spindle are formed two bearings or rather bearing supports C—D, both perfectly cylindrical and aligned on the axis B—B.

On these two bearing areas C—D go the annular ball or roller bearings on which the front wheel of the automobile rotates, the wheel being provided with proper aligned seats to fit over the roller or ball bearings, all as well known in the art and not shown in the drawing.

Now then, it frequently happens that the wheel spindles become slightly bent at a point E due to shock or accident and with a result that the wheel wobbles or the unequal pressure on the bearings due to the misalignment soon renders the bearings worthless.

Therefore, in overhauling a car and testing these spindles for alignment of their bearing areas C—D it has heretofore been necessary to completely remove the steering knuckle (after taking off the wheel and bearings) and place the knuckle in a lathe between centers B—B, the center shown on the body 1 being there provided in the manufacture of the knuckle.

Such removal of a steering knuckle is a laborious job, especially on a heavy car or truck, as the steering connections must be removed, also in the case of front wheel brakes these offer more complexity, and besides in this case the flange F is very large so as to necessitate swinging in a large lathe either not available, or costly in overhead to operate—hence the testing of front wheel spindles for alignment of their bearing surfaces becomes a costly labor job, regardless of the nature of the instruments used to check it after the knuckle is once swung in a lathe.

However, we have discovered a method of testing the alignment and rotundity of steering knuckle spindles without disconnecting the knuckle or removing it from the car, it simply being necessary to remove the front wheel with its bearings and check the spindle with the apparatus shown in the drawing.

The apparatus shown in Fig. 1 comprises a yoke 4 provided with a fixed V block 5 at its upper end and a movable V block 6 diametrically opposite at its lower end swivelly carried on a screw 7 threaded through a boss in the yoke (see Fig. 3) so that the movable V block may be adjusted to and from the fixed V block.

From the fixed V block an arm 8 extends at right angles to the plane of the block and which arm is slotted at its end at 9, while seated in the slot and adjustable therealong is a post 10 clamped in any position by means of a thumb screw 11.

At the end of this post 10 is a hole through which passes the supporting rod 12 of a micrometer gage 13.

This gage 13 is of the dial type with a graduated face at 14 and a pointer 15 adapted to swing around the face when the stylus or gage foot 16 is pushed toward the body of the gage, and the dial of the gage is mounted on a revolvable ring 17 so that no matter how far inward the stylus be pushed the dial may be revolved to give the hand a zero reading.

The gage mechanism being an article of commerce is in itself not a feature of the invention apart from its associated parts and hence the particular gage mechanism is unimportant and not described herein.

In Fig. 2 the construction of clamping post 10 is clearly shown, the post being drilled to pass a screw rod 17 forming part of a head 18 necked to fit within a depression 19 in the post and cross-drilled at 20 to receive the gage-supporting rod 12 and which construction provides for simultaneous clamping of the rod 12 and arm 8 by the post 10 by a single thumb nut 11.

Thus the gage may be adjusted longitudinally of the arm 8 either in the slot 9 or on the rod 12, or both, or twisted on post 10, or in the opposite plane on rod 12, or both.

With the apparatus as described the yoke 4 is slipped over a steering knuckle spindle and the V blocks adjusted to gently clamp against the larger bearing C, while the gage pin 16 is brought to bear radially against the outer or smaller bearing D and preferably the gage dial revolved to bring the pointer 15 to the zero of the graduations, and thereupon, by gently grasping and revolving the yoke 4 with the hand the gage pin 16 will travel around the periphery of the smaller bearing D and if any fluctuation of the hand takes place it at once indicates the bearings misaligned due to a bent spindle, or out of round, depending on the nature of the pointer oscillations.

If there is substantially no movement of the micrometer hand as the yoke is slowly revolved around the spindle the bearings are aligned and are also round.

It is manifest that the apparatus may be used on knuckles taken from the vehicle, or tested at the factory before placing on the vehicles, and also that the spindle may be revolved in the yoke and the apparatus held stationary with the same result as described.

We claim:

1. Apparatus for testing alignment of spaced bearing areas on a common axis comprising a yoke member adapted to straddle one bearing area and provided with means for frictionally engaging the same, a gage, means for supporting said gage from said yoke member, said gage being arranged on said supporting means to bear against the other bearing area for recording the relative alignment of the two bearing areas as the yoke and bearing area with which it contacts are given relative rotation.

2. Apparatus for testing alignment of spaced bearing areas on a common axis comprising a yoke member adapted to straddle one bearing area and provided with means for frictionally engaging the same, a micrometer dial reading gage, means for supporting said gage from said yoke member, said gage being arranged on said supporting means to bear with its stylus against the other bearing area for recording the relative alignment of the two bearing areas as the yoke and bearing area with which it contacts are given relative rotation.

3. In a structure as specified in claim 2, an extension from said yoke, and means adjustably supporting said gage on said extension for sliding movement therealong.

4. In a structure as specified in claim 2, an extension from said yoke, and means adjustably supporting said gage on said extension for slidng movement therealong and for rocking movement.

5. Apparatus for testing alignment of spaced bearing areas as found on a steering knuckle spindle, comprising a pair of bearing blocks, means whereby the blocks are adjustably mounted for frictionally gripping one of the bearing areas, an arm extending from one of the blocks substantially parallel to the axis of the spindle when the blocks are in position, a micrometer gage mounted on the arm and adjustably arranged for indicating the relation of the surface of the other bearing area to the area gripped by the blocks as the spindle and blocks are given relative rotation.

6. In a structure as specified in claim 5 said bearing blocks being confronting V blocks and one of the blocks swivelly mounted on the end of an adjusting screw.

WILLIAM E. THAYER.
FREDERICK W. WEST.